3,417,025
PAINT STRIPPING COMPOSITION

Joseph Cooper and William J. Corbett, Cincinnati, Ohio, assignors to W. R. Grace & Co., New York, N.Y., a corporation of Connecticut
No Drawing. Filed July 20, 1966, Ser. No. 566,468
4 Claims. (Cl. 252—152)

This invention relates generally to an improved process for removing paints and synthetic coatings and compositions therefor, and more particularly to a composition and method for stripping paints, enamels, synthetic resin coatings and other organic finishes from metals and the surfaces of other materials.

In summary, this invention relates to the use of 2-(2-aminoethoxy) ethanol for paint stripping purposes. In a preferred embodiment of this invention the 2-(2-aminoethoxy) ethanol is used primarily in formulations containing caustic hydroxides, wetting agents, sequestants and other materials.

In industrial production of automobiles, refrigerators, stoves and many similar commercial articles, a highly resistant and durable finish is applied to beautify and protect the same. Over the past years, these finishes have been greatly improved in regard to resistivity against attack by solvents and against other damage. At present, and in contrast to finishes in common use about 10 years ago, these finishes are highly complex in chemical structure, frequently containing synthetic resins having widely varying chemical structures and properties.

In the manufacture of the above articles, particularly when using mass production techniques, it is frequently necessary to remove the finish from imperfect or damaged articles. In normal operation, a certain percentage of the finished articles have flaws and require reprocessing, necessitating removal of the highly resistant finish. In addition, it is frequently desired to refinish painted articles, in which event it also is necessary or highly desirable to remove the original finish.

Prior to this invention, a large number of stripping solutions have been suggested containing mainly caustics and materials such as various phenolic and cresolic compounds.

The above discussed stripping materials, while suitable for paints and other finishes in common use several years ago, are entirely unsuitable for many of the improved finishes presently in general use.

In particular, they require long period of contact of the finish with the stripping solution, resulting in low production and increased cost of operations. However, of primary importance, the above prior stripping solutions did not remove a thin deposit of finish components which adhere tenaciously to the surface of the article and which had to be removed prior to refinishing the article. In consequence, this deposit had to be removed manually, which increased considerably the time and cost involved in the reclaiming of imperfect parts or articles.

In employing prior stripping solutions for removing many present day finishes, after the bulk of the finish has been removed by the solution, the article or part must be brushed or rinsed several times to obtain a suitably clean surface, such as is necessary for refinishing the article. However, even after such repeated mechanical operations, the surface is not entirely free from foreign materials, which materials adversely affect the adherence of any subsequent finish. It appears therefore that the stripping compounds previously in use do not completely break or otherwise sever the adherent bond between the finished surface and the finish itself.

It is therefore a principal object of this invention to provide an improved stripping solution and method for removing organic finishes such as paints, enamels, synthetic coatings and similar finishes. It is another object of the present invention to provide a composition of the above type and method which will leave the surface of the article or part in suitable condition for refinishing without the necessity of additional cleaning operations, such as brushing, scraping and the like. Another object of this invention is to provide a stripping composition and method which will completely remove a large variety of finishes in a minimum period of time. Other objects of the invention will appear in the following description and appended claims.

We have now found that if 2-(2-aminoethoxy) ethanol is added to alkali metal hydroxide solutions the resulting solution is materially and unexpectedly more reactive to paints, enamels, synthetic coatings and other organic finishes than aqueous alkali metal solutions themselves or any of the phenolic-cresylic type paint remover compositions heretofore known.

The effectiveness of the 2-(2-aminoethoxy) ethanol is particularly surprising in that solutions of 2-(2-aminoethoxy) ethanol have no effect on such finishes, in the absence of an alkali metal hydroxide. However, when combined with the alkali metal hydroxide, the resulting solution is considerably more reactive to organic finishes than the alkali metal hydroxide itself. With such solutions, the time of stripping is considerably reduced, low concentrations of alkali metal hydroxide are permissible, but of primary importance, no residual film or composition remains on the surface of the part which necessitates brushing, scraping or other mechanical operations prior to refinishing of the article or part. Instead, after subjection of the finished article to an alkali metal solution containing a 2-(2-aminoethoxy) ethanol, the part or article from which the finish is removed only requires at most a simple water rinse or wash and the so-treated surface is immediately ready for refinishing.

Of particular importance is the activity of the composition of this invention, containing 2-(2-aminoethoxy) ethanol, for many synthetic resin coatings which were entirely resistant, or practically resistant to prior paint remover compositions. Included in such coatings are alkyd resins, modified alkyd resins, such as styrenated alkyds, urea formaldehyde resins, melamine resins, metallic type paints, silicone resins, epoxy resins, acrylics and modified acrylic resins, and the like.

The major active compound in our inventive composition, 2-(2-aminoethoxy) ethanol,

$$NH_2CH_2CH_2OCH_2CH_2OH$$

(molecular weight=105.14), is an essentially colorless, slightly viscous liquid, with a mild amine odor. It is miscible with water and alcohol; has a boiling point of 221° C. at 76 millimeters of mercury and a specific gravity (20/20° C.) of 1.0572. It operably can be employed in my composition in 5–20 weight percent concentration, and preferably 16 wt. percent.

The caustic material employed can be either potassium or sodium hydroxide, the former being preferred. Operably 50–70 weight percent of a 3–50 weight percent solution of the caustic is used and preferably about 60 parts weight percent. Other basic materials can also be utilized successfully for this invention, such as: lithium hydroxide, nebidium hydroxide, cesium hydroxide, and basic salts thereof, such as the carbonates, silicates, and phosphates.

In addition, the solution can also contain soaps, resinates, or synthetic organic surface active agents and other water softening, sequestering, dispersing, or suspending agents.

For instance, sodium glucoheptonate is useful as a sequestrant, as are the sugar acid sequestrants. These are operably employed in ranges up to about ten weight percent.

Also, wetting agents can be employed up to about 5 weight prcent and emulsifying agents up to about 5 weight percent.

With the present invention, a finish can be removed from a surface, such as a metal surface, not deleteriously attacked by the stripping solution of this invention, by immersion of the surface in a vessel containing the alkali metal hydroxide and the 2-(2-aminoethoxy) ethanol. The finish is maintained in contact with the cleaning solution for a time sufficient to break the bond between the finish and the surface of the part or article and, if necessary, is thereafter rinsed or sprayed with water to remove all of the finished components. In general, the time of contact required is between ½ and 40 minutes; however, the required time is dependent on the resistivity of the particular finish, the thickness of the painted finish and the temperature employed. Alternatively, the finish can be sprayed with the stripping solution of this invention.

The temperature of the above solution can be varied between room temperature and the boiling temperature thereof, although, in general, it is preferred to use higher temperatures, so as to decrease the time of contact of the finish with the stripping solution. In any event, however, the present stripping solution reduces the contact time when operating either at lower or higher temperatures.

The following are typical examples of the present process and of suitable stripping solutions embodying the features of the present invention:

Example 1

| | Parts by weight |
|---|---|
| Potassium hydroxide | 428 |
| 2-(2-aminoethoxy) ethanol | 50 |

The above composition was diluted with water to make up 84 gallons of stripping solution. This solution was used at its boiling point to strip an enamel finish consisting of alkyd urea melamine containing titanium dioxide as the white pigment from refrigerator panels and electric automatic ironer panels. The panels were immersed in the solution for seven (7) minutes and the panels were then rinsed with water. The bond between the enamel and the metal surface was completely broken and the coating was completely rinsed from the metal with water. The metal surface was left extremely clean and was in excellent condition for immediate refinishing.

Example 2

A solution of the same total concentration as in Example 1 and using the same alkali compound was made up without adding the 2-(2-aminoethoxy) ethanol. Enameled strip portions from the same stock of panels were immersed for 2 hours in this solution, heated to the boiling point. The panels were then rinsed several times with water without satisfactorily removing the finish from the panels.

Example 3

16 parts of 2-(2-aminoethoxy) ethanol were added to 65 parts of an aqueous potassium hydroxide solution (41.54 wt./wt. percent concentration). 2.1 parts of sodium glucoheptonate were then added.

The mixture was heated to about 220° F. and applied to an acrylic painted metal surface. After 5 minutes the film became raised and softened. The entire raised film was removed by flushing with a water stream. The clean metal was grease free and smooth; it showed no paint traces. The metal was then repainted and paint adhered excellently.

What is claimed is:

1. A process for stripping a synthetic resin finish, comprising the steps of contacting the finish with an aqueous solution consisting essentially of water, between about 50 and 70 weight percent of an alkali metal hydroxide, and between about 5 and 20 weight percent of 2-(2-aminoethoxy) ethanol for a time sufficient to loosen the finish from the surface, and thereafter removing said loosened finish completely from said surface.

2. The process of claim 1 wherein said aqueous solution also contains up to about 10 weight percent of a sequestrant consisting essentially of sodium glucoheptonate.

3. A stripping solution for removing synthetic resin finishes, the solution consisting essentially of an aqueous solution of water, between about 50–70 percent by weight of an alkali metal hydroxide, between about 5–20 wieght percent of 2-(2-aminoethoxy) ethanol, and up to 10 weight percent sodium glucoheptonate.

4. The stripping composition of claim 3 in which the alkali metal hydroxide is potassium hydroxide.

References Cited

UNITED STATES PATENTS

| 2,940,877 | 6/1960 | Jaffe et al. | 134—38 |
| 3,105,822 | 10/1963 | Karabinos et al. | 252—156 |

LEON D. ROSDOL, *Primary Examiner.*

S. D. SCHWARTZ, *Assistant Examiner.*

U.S. Cl. X.R.

252—156; 134—38